US010831216B2

(12) United States Patent
Han et al.

(10) Patent No.: US 10,831,216 B2
(45) Date of Patent: Nov. 10, 2020

(54) UAV POSITIONS METHOD AND APPARATUS

(71) Applicant: INTEL CORPORATION, Santa Clara, CA (US)

(72) Inventors: Ke Han, Shanghai (CN); Zhen Zhou, Shanghai (CN); Guangyu Ren, Shanghai (CN); Zhiqiang Qin, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 424 days.

(21) Appl. No.: 15/573,313

(22) PCT Filed: Dec. 22, 2016

(86) PCT No.: PCT/CN2016/111438
§ 371 (c)(1),
(2) Date: Nov. 10, 2017

(87) PCT Pub. No.: WO2018/112823
PCT Pub. Date: Jun. 28, 2018

(65) Prior Publication Data
US 2020/0033888 A1 Jan. 30, 2020

(51) Int. Cl.
*G05D 1/10* (2006.01)
*B64C 39/02* (2006.01)
(Continued)

(52) U.S. Cl.
CPC ........... *G05D 1/101* (2013.01); *B64C 39/024* (2013.01); *G01C 5/06* (2013.01); *G01S 5/0278* (2013.01);
(Continued)

(58) Field of Classification Search
CPC ............ G05D 1/101; B64C 39/024; B64C 2201/027; B64C 2201/145; G01C 5/06;
(Continued)

(56) References Cited

U.S. PATENT DOCUMENTS 9,527,587 B2 * 12/2016 Levien ................. B64C 39/024
2014/0222248 A1 * 8/2014 Levien ................. B64C 39/024
701/2
2016/0288905 A1 * 10/2016 Gong ...................... G06F 16/29

FOREIGN PATENT DOCUMENTS

CN   104854428 A    8/2015
CN   105022401 A    11/2015
(Continued)

OTHER PUBLICATIONS

International Search Report and Written Opinion, dated Sep. 21, 2017, issued in related International Application No. PCT/CN2016/0111438, 12 pages.

*Primary Examiner* — Gertrude Arthur Jeanglaude
(74) *Attorney, Agent, or Firm* — Schwabe, Williamson & Wyatt, P.C.

(57) ABSTRACT

Apparatus, method and storage medium associated with UAV position estimation are disclosed herein. In embodiments, an UAV may comprise a transmitter-receiver arrangement to transmit and receive communication signals, including receipt of absolute positioning system (APS) signals from one or more APS sensors, and wireless signals from one or more proximately located other UAVs; one or more motors or engines to provide propulsive force for the UAV; and a flight controller coupled to the transmitter-receiver arrangement and the one or more motors or engines to control at least the one or more motors or engines to provide propulsive force to navigate the UAV, based at least in part on the APS and relative positioning signals. Other embodiments may be disclosed or claimed.

21 Claims, 4 Drawing Sheets

(51) Int. Cl.
 G01C 5/06 (2006.01)
 G01S 5/02 (2010.01)
 G01S 5/06 (2006.01)
 G01S 11/06 (2006.01)
 G01S 19/46 (2010.01)
(52) U.S. Cl.
 CPC ................. *G01S 5/06* (2013.01); *G01S 11/06* (2013.01); *G01S 19/46* (2013.01); *B64C 2201/027* (2013.01); *B64C 2201/145* (2013.01)
(58) Field of Classification Search
 CPC .......... G01S 5/0278; G01S 5/06; G01S 11/06; G01S 19/46
 USPC ............................................................ 701/3
 See application file for complete search history.

(56) References Cited

FOREIGN PATENT DOCUMENTS

| | | |
|---|---|---|
| CN | 105472672 A | 4/2016 |
| CN | 105492985 A | 4/2016 |
| WO | 2016023224 A1 | 2/2016 |

* cited by examiner

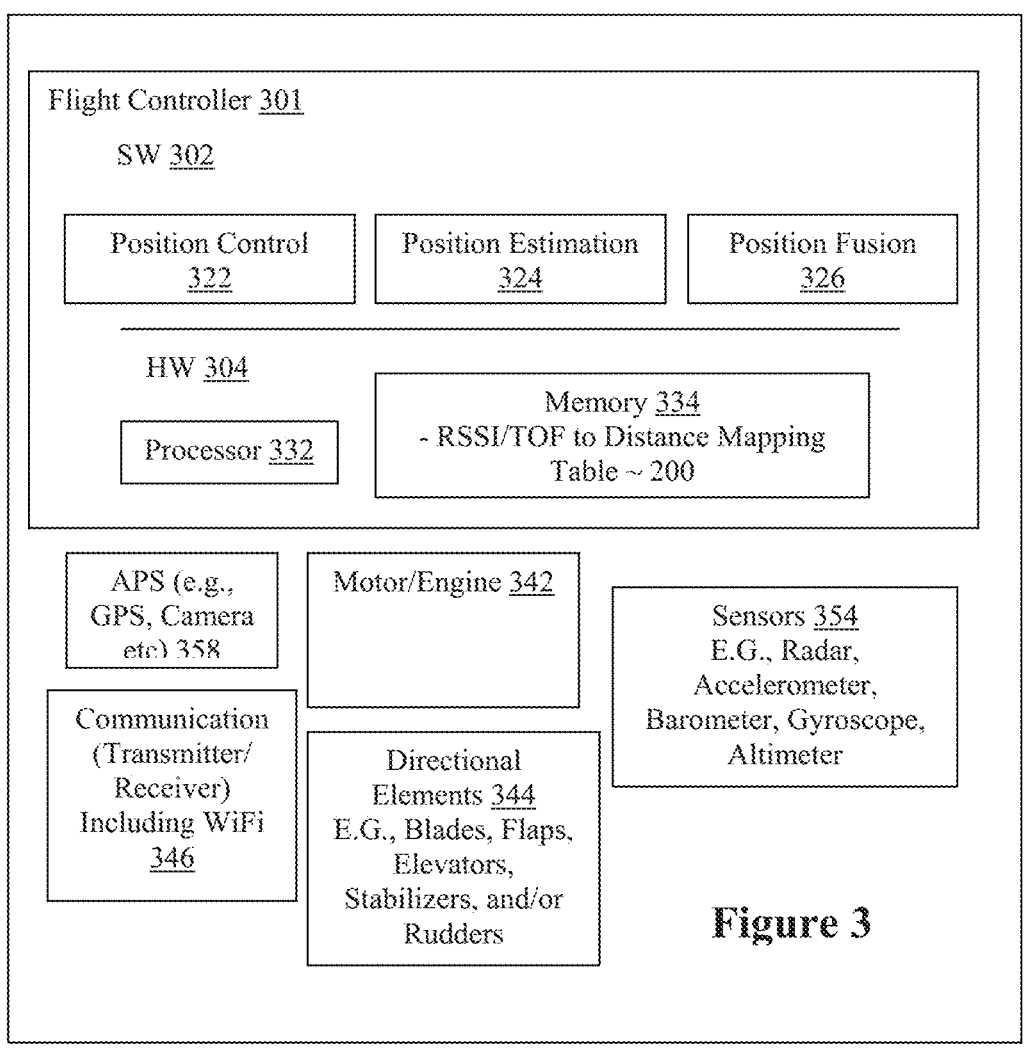

```
Non-transitory computer-readable storage medium
                        602

Programming Instructions 604
configured to cause a Drone or a BS, in response to execution of
the programming instructions, to practice (aspects of) present
    disclosure described with references to Figure 1-4
```

UAV POSITIONS METHOD AND APPARATUS

CROSS-REFERENCE TO RELATED APPLICATION

The present application is a national phase entry under 35 U.S.C. § 371 of International Application No. PCT/CN2016/111438, filed Dec. 22, 2016, entitled "UAV POSITIONS METHOD AND APPARATUS," which designates the United States of America, the entire disclosure of which is hereby incorporated by reference in its entirety and all purposes.

TECHNICAL FIELD

The present disclosure relates to the field of unmanned aerial vehicles (UAV) (also referred to as "drone"). In particular, the present disclosure is related to method and apparatus for determining UAV positions to facilitate operation of the UAVs.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Drones' positions are typically determined by, their onboard flight control systems, using Global Positioning System (GPS) and barometric data. Error in this manner of position determination may be considered not small (5-20 m), depending on the precision needed. For example, for formation flying, under the prior approaches, drone sometimes does not fly to the required position due to this error, resulting in imperfect formation or pattern in the sky.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 2 illustrates an example data structure of RSSI/TOF to distances, according to some embodiments.

FIG. 3 illustrates example architecture of an UAV equipped with the position estimation technology of the present disclosure, according to some embodiments.

DETAILED DESCRIPTION

Figure 1:
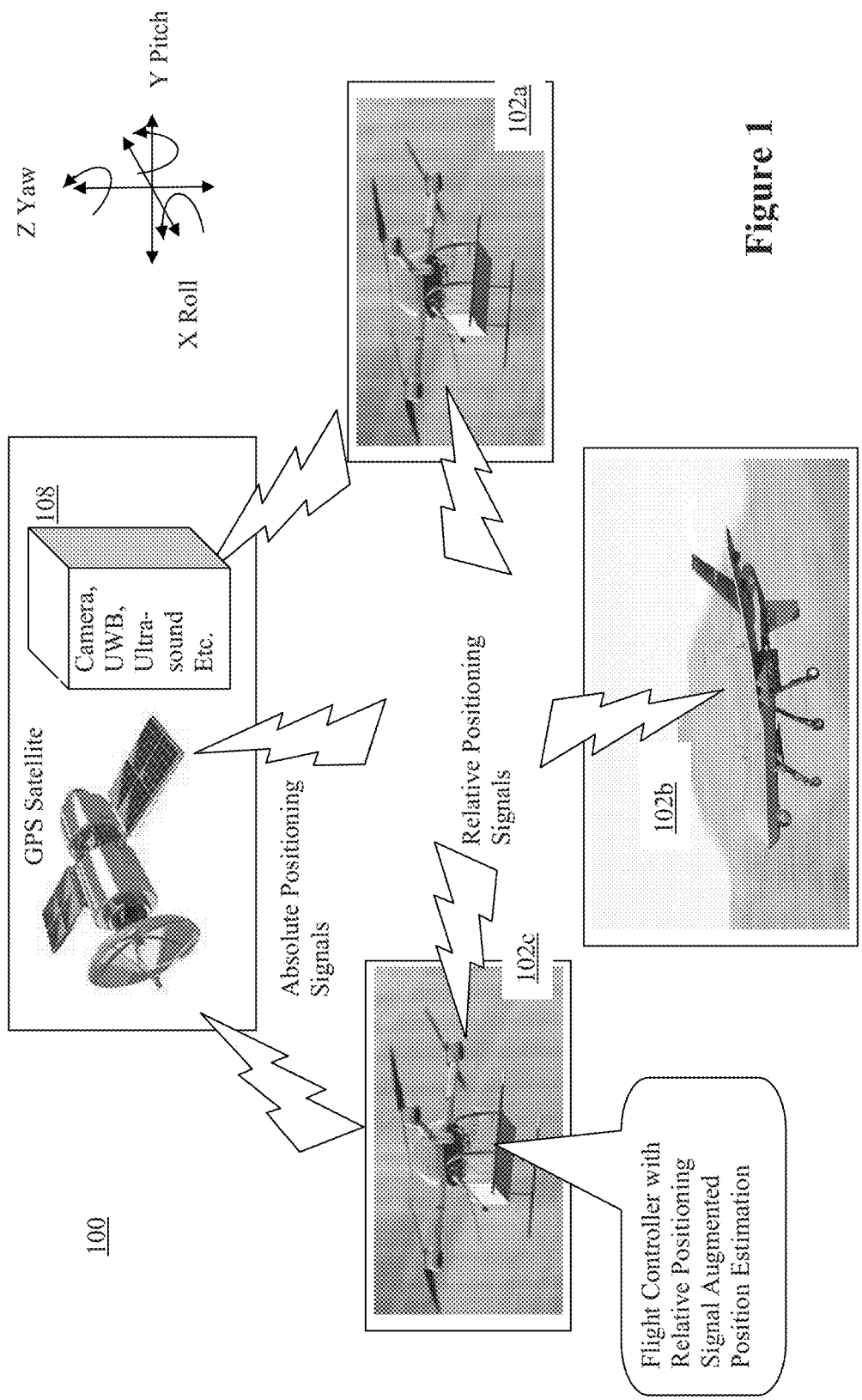
FIG. 1 illustrates an overview of a plurality of UAV incorporated with the position estimation technology of the present disclosure, in accordance with various embodiments.

Apparatus, method and storage medium associated with UAV position estimation are disclosed herein. In embodiments, an UAV may comprise a transmitter-receiver arrangement to transmit and receive communication signals, including receipt of global absolute positioning system (APS) signals from one or more APS sensors, and relative positioning signals from one or more proximately located other UAVs; one or more motors or engines to provide propulsive force for the UAV; and a flight controller coupled to the transmitter-receiver arrangement and the one or more motors or engines to control at least the one or more motors or engines to provide propulsive force to navigate the UAV, based at least in part on the APS and relative positioning signals.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. The terms "motor" and "engine" are synonymous unless the context clearly indicates otherwise.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs having one or more machine instructions (generated from an assembler or from a high level language compiler), a combinational logic circuit, and/or other suitable components that provide the described functionality.

Referring now to FIG. 1, wherein an overview of a plurality of UAV incorporated with the position estimation technology of the present disclosure, in accordance with various embodiments, is shown. As illustrated, a number of UAVs 102a-102c that proximately operate from each other, may be respectively incorporated with the position estimation technology of the present disclosure. That is, each of UAVs 102a-102c, as shown for UAV 102c, may be equipped with a flight controller (301 of FIG. 3) that has or employs relative positioning signal augmented position estimation. In other words, in embodiments, each flight controller (301 of FIG. 3) may be configured to estimate the host UAV's position based at least in part on APS, barometric, and relative positioning signal data. The APS signals may be GPS signals from one or more GPS satellites (when operating outdoor) or positioning signals from camera(s), ultra-wide band (UWB) sensors, ultrasound sensors, and so forth (when operating indoor inside a building). In embodiments, the relative positioning signal data may be data indicative of distances to the proximally located other UAVs derived from wireless signals (e.g., WiFi signals) received from the respective other UAVs. For example, UAV 102c (by itself or with the assistance of a ground station/controller in communication with the UAV) would estimate its position based on APS data, barometric data, and distance data of UAV 102a and 102b derived from relative positioning wireless (e.g., WiFi) signals respectively received from UAV 102a and 102b. [Note, in embodiments, a ground controller may be a handheld device.]

To provide the APS, barometric, and relative positioning signal data, each of UAVs 102a-102c may be continued with corresponding APS receivers to receive APS signals of its APS location from one or more GPS satellites or indoor sensors 108, on-board barometers, and wireless signal (e.g., WiFi) receivers to receive wireless (e.g., WiFi) signals from the proximally located UAVs (see e.g., 346 of FIG. 3).

To derive the distance data from received relative positioning wireless (e.g., WiFi) signals, each of UAVs 102a-102c (that does not need the assistance of a ground station/controller) may be configured with a table that translates either the received signal strength indicator (RSSI) and/or time of flight (TOF) of the wireless (e.g., WiFi) signals from the proximate UAVs to distances from the proximate UAVs (see 202 and 204 of Table 200 of FIG. 2). The translation table (200 of FIG. 2) may be developed from observations collected from laboratory or field experiments.

In alternate embodiments, each of such UAVs 102a-102c may be configured to compute the distance from RSSI of WiFi signals (or RSSI of WiFi signals from distance) using the below formulas instead:

Distance RSSI/(−33.84)^(1/0.1676)

RSSI=−33.84*Distance ^0.1676

The computed distances of the proximate UAVs may then be employed to augment the APS and/or barometric signals in estimating an UAV's position (to be described more fully below).

In still other embodiments, each of UAVs 102a-102c may be configured to seek assistance of a ground station/controller in communication with the UAV, in determining the distances of the proximate UAVs and/or applying the determined distances to augment estimation of the UAV's position. In some of these embodiments, each of UAVs 102a-102c may be configured to provide the wireless signal data to the ground station/controller to compute the distances of the proximate UAVs, and return the computed distances to the UAV. In other ones of these embodiments, each of UAVs 102a-102c may be configured to further provide the GPS/APS and/or barometric signals to the ground station controller to estimate the UAV's position, and return the estimated position to the UAV.

Still referring to FIG. 1, each of UAVs 102a-102c may be a quadcopter propelled by rotating blades driven by corresponding motors (as in the case of UAV 102a and 102c), or an unmanned winged aircraft with flaps, elevators, stabilizers, rudders, and so forth, propelled by a jet engine (as in the case of UAV 102b). In alternate embodiments (not shown), an UAV may be an unmanned single motor helicopter, a dual copter, a tricopter, and so forth. Regardless of the propulsion system flight controller 301 of each of UAVs 102a-102c may be configured to control the directional elements of the UAV (i.e., the rotating blades, the flaps . . . and so forth) to provide a desired amount of roll, pitch, and/or yaw to navigate the UAV. In other words, except for the wireless signal augmented position estimation technology, each of UAVs 102a-102c may be any one of a number of UAVs known in the art.

These and other aspects of UAVs 102a-102c will be further described with references to the remaining Figures. Before doing so, it should be noted that while for ease of understanding, only 3 UAVs 102a-102c are illustrated in FIG. 1, the present disclosure is not so limited. The present disclosure may be practiced with any number of UAVs greater than or equal to 2.

Referring now to FIG. 3, wherein example architecture of a UAV equipped with the wireless signal augmented position estimation technology, according to some embodiments, is illustrated. As shown, UAV 102* (which denotes either 102a, 102b or 102c) may comprise flight controller 301, APS receiver 358, sensors 354, communication interface 346, motor/engine 342 and directional elements 344.

APS receiver 358 may be configured to communicate with GPS satellites or indoor sensors 108 to obtain and provide APS information. Sensors 354 may include, but are not limited to radars, accelerometers, gyroscopes, barometers, altimeter, and so forth. In embodiments, cameras may include 2D, 3D, depth, and/or infrared cameras.

Communication interface 346 may include a transmitter and a receiver. In embodiments, communication interface 346 may include a transceiver. Communication interface 346 may be configured to perform wireless communication in any one of a number of wireless communication protocols, 3G/4G, Long Term Evolution (LTE), and/or WiFi. Communication interface 346 may be also configured to support Near Field Communication (NFC) and/or Bluetooth®.

Directional elements 344 may include blades, flaps, elevators, stabilizers, rudders, and so forth.

Flight controller 301 may be configured to control navigation of UAV 102*. That is, flight controller 301 may be configured to provide relative control to motor 342 to provide the desired roll, pitch and/or yaw to navigate UAV 102. In various winged embodiments, flight controller 301 may be configured to provide control to engine 342 and directional elements 344 such as flaps, elevators, stabilizers and/or rudders to provide the desired roll, pitch and/or yaw to navigate UAV 102. Further, in embodiments, flight controller 301, as described earlier, may be configured to receive APS data from APS receiver 358, barometric data from sensor 354, and wireless (RSSI or TOF) data from communication interface 346, and estimate position of UAV 102* based at least in part on the APS, barometric and relative positioning signal data. In other embodiments, flight controller 301 may be configured to cause APS, barometric, and/or relative positioning wireless data be provided to a ground station controller to assist flight controller 301 in determining the distance of the proximate UAVs or estimate a current position of the UAV 102.

In embodiments, except for flight controller 301, motor/engine 342, directional elements 34, communication interface 346, sensors 354 and APS receiver 358 may be any one of these elements known in the art.

In embodiments, flight controller 301 may be implemented in hardware e.g., an ASIC embodied with circuitry that provides the described functions, including the wireless signal augmented position estimation technology, or a programmable logic device, such as an FPGA programmed with logic to provide the described functions.

In embodiments, flight controller 301 may be implemented with hardware/software combination, such as software 302 and hardware 304. For examples, hardware 304 may include processor 332 having one or more processor cores, and memory 334 which may be any non-volatile storage, having a copy of the earlier described RSSI/TOF to distance mapping table 200. Software 302 may include e.g., position control module 322, position estimation module 324 and position fusion module 326. Position control module 322 may be configured to provide the control to motor/engine 342 and directional elements 344. Position estimation module 324 may be configured to provide the nominal estimation of the position of UAV 102*, and position fusion module 326 may be configured to refine the nominal estimation of the position of UAV 102*, taking into account the relative positioning wireless signal (e.g., WiFi) data derived from the wireless (e.g., WiFi) signals received from other proximally located UAV 102*. Position control module 322 may be further configured to refine the control provided to motor/engine 342 and directional elements 344, in view of the refined position estimations. Modules 322-326 may include machine instructions that provide the described functions of flight controller 301, when executed by processor 332. The machine instructions may be generated from an assembler and/or compiled from a high level language compiler.

In embodiments, except for its leverage of the refined position estimations provided by position fusion module 326, position control module 322 may be otherwise any one of such elements known in the art. Similarly, except for provision of its position estimations to position fusion module 326 to refine, position estimation module 324 may likewise be any one of such elements known in the art.

In embodiments, position fusion module 326 may refine the nominal position estimation by determining the refined position estimation as the position estimation that minimizes the following loss function (L):

$$L = \Sigma_{i=1,N} |P_{est,i} - P_{aps,i}|^2 + \Sigma_{i=1,N} \Sigma_{j=1,N} \eta (\text{DistToRSSI}(+P_{est,i} - P_{est,j}+) - \text{RSSI}_{i,j})^2$$

where
N is the number of UAV;
$P_{est,\,i}$ is the nominal estimated position of UAV i;
$P_{aps,\,i}$ is the APS and/or barometer position of UAV i;
DistToRSSI( ) is the function the transform distance into RSSI;
$\text{RSSI}_{i,j}$ is the measured RSSI between $\text{UAV}_i$ and $\text{UAV}_j$;
$\eta$ is the weight in loss function.

In embodiments, for $\text{RSSI}_{i,j}$, the median RSSI from multiple samples (e.g., 20 samples from each UAV is used).

In alternate embodiments where flight control 301 is configured to seek assistance from a ground station/controller in determining the distances of the proximate UAVs, and/or estimating a current position of the UAV, position estimation module 324 and/or position fusion module 326 may be omitted and moved to the ground station/controller instead.

Figure 4:
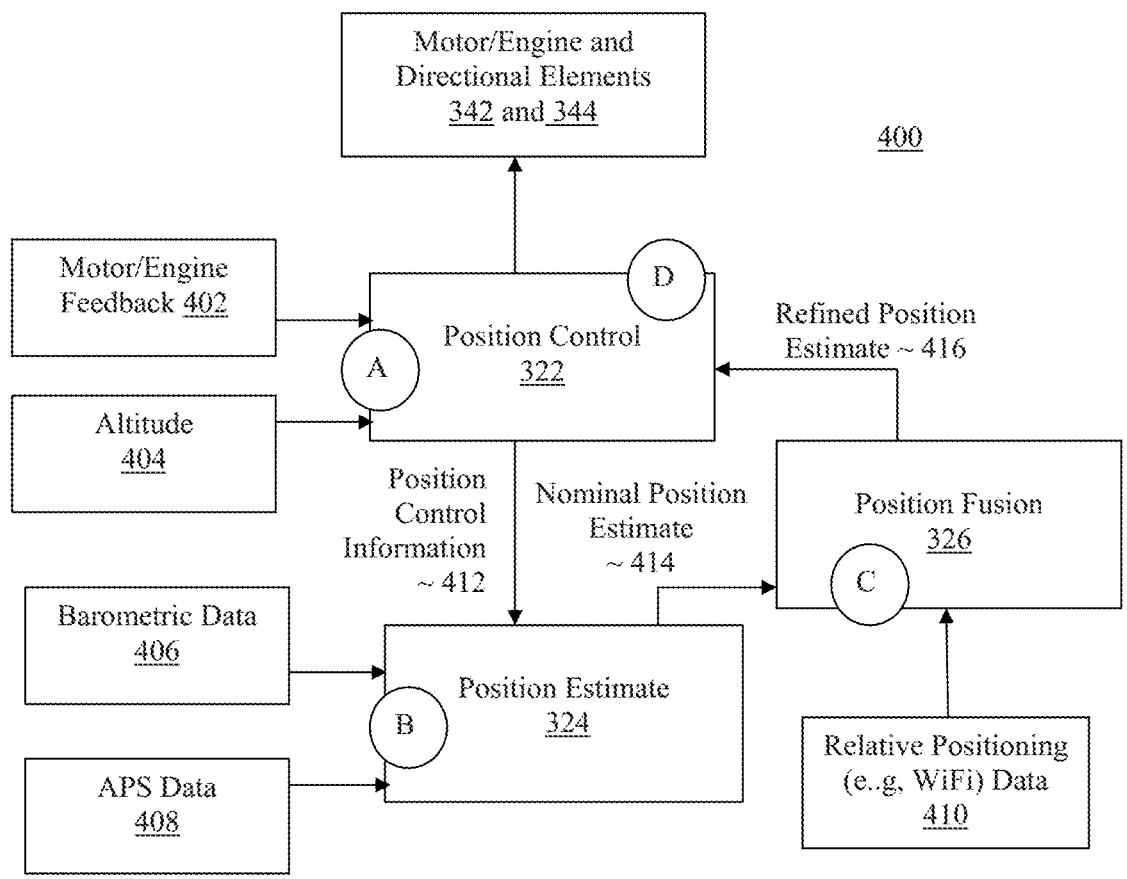
FIG. 4 illustrates an example process for estimating a position of an UAV, according to some embodiments.

Referring now to FIG. 4, wherein an example process for estimating a position of an UAV, according to some embodiments, is illustrated. As shown, process 400 may include operations performed at points A-D. The operations may be performed e.g., by the earlier described position control module 322, position estimation module 344, and position fusion module 326 (located on the UAV and/or a ground station controller).

Process 400 may start at point A. At point A, position control module 322 may receive motor/engine feedback 402 from motor/engine 342, and current altitude data 404 from altimeter 354. In turn, position control module 322 may generate and provide control information to motor/engine 342 and directional elements 344. Position control module 322 may also make available the position control related information 412 to position estimation module 324.

At point B, position estimation module 324, in addition to the position control related information 412 from position control module 322, may also receive barometric data 406 from barometer 354, and APS data 408 from APS receiver 358. In response, position estimation module 324 may make an initial/nominal estimation of a current position 414 of the UAV 102*, based on position control related information 412, barometric data 406, and APS data 408.

At point C, position fusion module 326 may receive the initial/nominal estimation of the current position 414 of the UAV 102* from position estimate module 324, and relative positioning wireless signal (e.g. WiFi) data 410 looked up from RSSI/TOF to distance mapping table 200 (using the RSSI/TOF data received from communication interface 346) or computed in real time using the above described formulas. In response, position fusion module 326 may refine the initial/nominal estimation of the current position 414 of the UAV 102* based on the wireless (e.g., WiFi) data 410, and generate a refined estimation of the current position 416 of UAV 102*, and provide the refined estimation of the current position 416 of UAV 102* to position control module 322.

At point D, position control module 322 may adapt the controls it provides to motor/engine 342 and directional elements 344, based on the refined estimation of the current position 416 of UAV 102*.

Process 400 may be iterated as long as necessary during operation.

In alternate embodiments, the various functions performed by position control module 322, position estimate module 324 and position fusion module 326 may be re-distributed, split and/or combined among them and/or other modules.

Figures 5, 6:
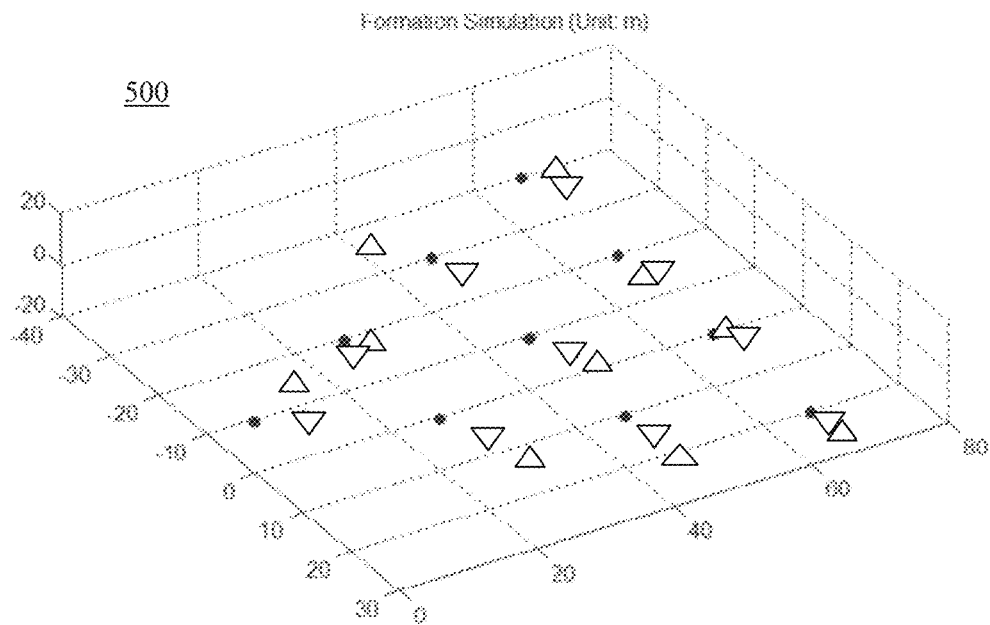
FIG. 5 illustrates an example formation of UAV having the position estimation technology of the present disclosure, according to some embodiments.
FIG. 6 illustrates an example computer-readable storage medium with instructions configured to enable an UAV to practice aspects of the present disclosure, in accordance with various embodiments.

Referring now to FIG. 5, wherein an example formation of UAV having the position estimation technology of the present disclosure, according to some embodiments, is shown. As illustrated, example formation 500 is to include 10 UAVs to operate in a coordinated triangular pattern/formation, which respective desired positions are denoted by the solid dots. The coordinated formation may be for any one of a number of applications, including but are not limited to firework shows, military scouting, heavy cargo carrying, fast pesticide spraying, and so forth. Further, note that the formation may be of other configurations, rectangular, quadrilateral, star, pentagon, hexagon, octagon, circle, oval, elliptical and so forth.

The upright triangles denote the likely positions of the various UAVs given the typical errors in position estimation based on APS and barometric data. The inverted triangles denote the positions of the various UAVs when position estimations based on APS and barometric data are augmented by relative positioning wireless signal (e.g., WiFi) data, as described. As can be seen, the UAVs are able to operate much closer to the desired positions when position estimation based on APS and barometric data are augmented by relative positioning wireless (e.g., WiFi) data.

It has been observed from experiments that the average error for the relative positioning (e.g., WiFi) signal augmented position (from the desired position) is ~5.8 m, whereas the average error for the APS (e.g., GPS) and barometer position (from the desired position) is ~11.2 m, an improvement of ~48%. Given that the new UAVs typically include WiFi sensors, the improvement (via using WiFi RSSI) can be obtained with virtually no extra hardware cost or no extra weight on board. In the alternative, if usage of TOF is desired, the improvement can be obtained with relatively low extra cost and weight.

Further, while for ease of understanding, the relative positioning signal augmented position estimation technology has been described with each of UAV 102* as having its position fusion module 326 performing its own refinement of position estimations, it should be noted that, in alternate embodiments, the refinement may be performed by a selected UAV on behalf of other UAV or another entity other than the UAVs, e.g., a command and control aircraft or ground station/controller.

FIG. 6 illustrates an example non-transitory computer-readable storage medium having instructions configured to practice all or selected ones of the operations associated with UAV 102*, earlier described, in accordance with various embodiments. As illustrated, non-transitory computer-readable storage medium 702 may include a number of programming instructions 704. Programming instructions 704 may be configured to enable an apparatus, e.g., flight controller 301 of UAV 102*, in response to execution of the programming instructions, to perform various UAV operations earlier described. In alternate embodiments, programming instructions 704 may be disposed on multiple non-transitory computer-readable storage media 702 instead. In still other embodiments, programming instructions 704 may be encoded in transitory computer readable signals.

Referring also to FIGS. 3 and 4, for some embodiments, at least one of processors 332 may be packaged together with a computer-readable storage medium having programming instructions 704 configured to practice all or selected aspects of flight controller 301 of UAV 102. For one embodiment, at least one of processors 332 may be packaged together with a computer-readable storage medium having programming instructions 704 to form a System in Package (SiP). For one embodiment, at least one of processors 332 may be integrated on the same die with a computer-readable storage medium having programming instructions 704. For one embodiment, at least one of processors 332 or 432 may be packaged together with a computer-readable storage medium having programming instructions 704 to form a System on Chip (SoC).

Thus, example embodiments described include:

Example 1 may be an unmanned aerial vehicle (UAV), comprising: a transmitter-receiver arrangement to transmit and receive communication signals, including receipt of absolute positioning system (APS) signals from one or more APS sensors, and relative positioning signals from one or more proximately located other UAVs; one or more motors or engines to provide propulsive force for the UAV, and a flight controller coupled to the transmitter-receiver arrangement and the one or more motors or engines to control at least the one or more motors or engines to provide propulsive force to navigate the UAV, based at least in part on the APS, and relatively positioning signals.

Example 2 may be example 1, wherein the flight controller may include a position fusion function to receive nominal position estimates from the position estimation function, and the relative positioning signals from the transmitter-receiver arrangement, and generate refined position estimates based at least in part on the nominal position estimates, and the relative positioning signals.

Example 3 may be example 2, wherein the position fusion function may determine one or more distances to the one or more proximately located other UAVs, based at least in part on received signal strength indicator (RSSI) or time of flight (TOF) of the relative positioning signals from the one or more proximately located other UAVs.

Example 4 may be example 3, wherein the position fusion function may generate the refined position estimates based to position estimates that minimize a loss function (L):

$$L = \Sigma_{i=1,N} |P_{est,i} - P_{aps,i}|^2 + \Sigma_{i=1,N} \Sigma_{j=1,N} \eta (\text{DistToRSSI}(+P_{est,i} - P_{est,j}+) - \text{RSSI}_{i,j})^2$$

where

N is the number of UAV;

$P_{est,\,i}$ is nominal estimated position of UAV i;

$P_{aps,\,i}$ is APS and barometer position of UAV i;

DistToRSSI( ) is a function the transform distance into RSSI;

$\text{RSSI}_{i,j}$ is measured RSSI between $\text{UAV}_i$ and $\text{UAV}_j$;

η is the weight in loss function.

Example 5 may be example 2, may further comprise a barometer to sense barometric pressure, wherein the flight controller may include a position estimation function to receive barometric pressure data from the barometer, the APS signals from the transmitter-receiver arrangement, and position control information, and generate the nominal position estimates based at least in part on the barometric pressure data, the position control information, and the APS signals.

Example 6 may be example 5, may further comprise an altimeter to sense current altitudes of the UAV, wherein the flight controller may include a position control function to receive feedback from the one or more motors or engines, and the current altitudes from the altimeter, and provide control signals to the one or more motors or engines and the control information to the position estimation function, based at least in part on the feedback and the current altitudes.

Example 7 may be example 6, wherein the position control function may further receive the refined position estimates, and provide control signals to the one or more motors or engines and the control information to the position estimation function, based on the refined position estimates.

Example 8 may be example 1, wherein the UAV is a dual copter, a tricopter or a quadcopter; wherein the one or more motors or engines comprise two, three or four motors, and wherein the flight controller may control an amount of propulsion provided by each of the two, three or four motors that includes controlling the two, three or four motors to provide different amounts of population to provide a desired roll, pitch or yaw for the UAV.

Example 9 may be example 1, wherein the one or more motors or engines may comprise a jet engine, and the UAV may further comprise one or more stabilizers, one or more flaps, one or more elevators and a rudder and wherein the flight controller may control an amount of jet propulsion provided by the jet engine, and to control one or more of the one or more stabilizers, the one or more flaps, the one or more elevators and the rudder to provide a desired roll, pitch or yaw for the UAV.

Example 10 may be any one of examples 1-9, wherein the APS signals from the one or more APS sensors may be Global Positioning System (GPS) signals, the relative positioning signals from the one or more proximately located UAVs may WiFi signals, and the flight controller may control at least the one or more motor or engines to provide propulsive force to navigate the UAV in formation with a plurality of other UAVs, including the one or more proximately located other UAVs.

Example 11 may be a method for operating an unmanned aerial vehicle (UAV), comprising: receiving, by the UAV, communication signals, including receiving absolute positioning system (APS) signals from one or more APS sensors, and relative positioning signals from one or more proximately located other UAVs; and controlling, by the UAV, at least one or more motor or engines of the UAV to provide propulsive force to navigate the UAV to navigate the UAV, based at least in part on the APS and relative positioning signals.

Example 12 may be example 11, wherein controlling may comprise receiving nominal position estimates and the relative positioning signals, and generating refined position estimates based at least in part on the nominal position estimates, and the relative positioning signals.

Example 13 may be example 12, wherein generating may comprise determining one or more distances to the one or more proximately located other UAVs, based at least in part on received signal strength indicator (RSSI) or time of flight (TOF) of the relative positioning signals from the one or more proximately located other UAVs.

Example 14 may be example 13, wherein generating the refined position estimates may comprise generating the refined position estimates based to position estimates that minimize a loss function (L):

$$L=\Sigma_{i=1,N}|P_{est,i}-P_{aps,i}|^2+\Sigma_{i=1,N}\Sigma_{j=1,N}\eta(\text{DistToRSSI}(+P_{est,i}-P_{est,j}+)-\text{RSSI}_{i,j})^2$$

where
N is the number of UAV;
$P_{est,\,i}$ is nominal estimated position of UAV i;
$P_{aps,\,i}$ is APS and barometer position of UAV i;
DistToRSSI( ) is a function the transform distance into RSSI;
$RSSI_{i,j}$ is measured RSSI between $UAV_i$ and $UAV_j$;
η is the weight in loss function.

Example 15 may be example 12, further comprising sensing barometric pressure, wherein controlling may comprise receiving by a position estimation function, barometric pressure data, the APS signals, and position control information, and generating, by the position estimation function, the nominal position estimates based at least in part on the barometric pressure data, the position control information, and the APS signals.

Example 16 may be example 15, may further comprise sensing current altitudes of the UAV, wherein controlling comprising receiving, by a position control function, feedback from one or more motors or engines, and current altitudes, and provide control signals to the one or more motors or engines and the position control information to the position estimation function, based at least in part on the feedback and the current altitudes.

Example 17 may be example 16, wherein controlling may further comprise receiving, by the position control function, the refined position estimates, and providing control signals to the one or more motors or engines and the control information to the position estimation function, based on the refined position estimates.

Example 18 may be any one of examples 11-17, wherein the ABS signals may be Global Positioning System (GPS) signals from one or more GPS satellites, the relative positioning signals from the one or more proximately located UAVs may be WiFi signals, and controlling may comprise controlling at least the one or more motor or engines to provide propulsive force to navigate the UAV in formation with a plurality of other UAVs, including the one or more proximately located other UAVs.

Example 19 may be one or more computer-readable media comprising instructions that cause an unmanned aerial vehicle (UAV), in response to execution of the instructions by one or more processors of the UAV, to provide a flight controller to receive communication signals, including receipt of absolute positioning system (APS) signals from one or more APS sensors, and relative positioning signals from one or more proximately located other UAVs, and to control at least the one or more motors or engines to provide propulsive force to navigate the UAV, based at least in part on the APS and relative positioning signals.

Example 20 may be example 19, wherein the flight controller may include a position fusion function to receive nominal position estimates from the position estimation function, and the relative positioning signals from the transmitter-receiver arrangement, and generate refined position estimates based at least in part on the nominal position estimates, and the relative positioning signals.

Example 21 may be example 20, wherein the position fusion function may determine one or more distances to the one or more proximately located other UAVs, based at least in part on received signal strength indicator (RSSI) or time of flight (TOF) of the relative positioning signals from the one or more proximately located other UAVs.

Example 22 may be example 21, wherein the position fusion function may generate the refined position estimates based to position estimates that minimize a loss function (L):

$$L=\Sigma_{i=1,N}|P_{est,i}-P_{aps,i}|^2+\Sigma_{i=1,N}\Sigma_{j=1,N}\eta(\text{DistToRSSI}(+P_{est,i}-P_{est,j}+)-\text{RSSI}_{i,j})^2$$

where
N is the number of UAV;
$P_{est,\,i}$ is nominal estimated position of UAV i; $P_{aps,\,i}$ is APS and barometer position of UAV i;
DistToRSSI( ) is a function the transform distance into RSSI;
$RSSI_{i,j}$ is measured RSSI between $UAV_i$ and $UAV_j$; η is the weight in loss function.

Example 23 may be example 1920, wherein the flight controller may include a position estimation function to receive barometric pressure data from, the APS signals, and position control information, and generate the nominal position estimates based at least in part on the barometric pressure data, the position control information, and the APS signals.

Example 24 may be example 23, wherein the flight controller may include a position control function to receive feedback from the one or more motors or engines, and the current altitudes, and provide control signals to the one or more motors or engines and the control information to the position estimation function, based at least in part on the feedback and the current altitudes.

Example 25 may be example 24, wherein the position control function may further receive the refined position estimates, and provide control signals to the one or more motors or engines and the control information, based on the refined position estimates.

Example 26 may be any one of examples 19-25, wherein the ABS signals may be Global Positioning System (GPS) signals from one or more GPS satellites, the relative positioning signals from the one or more proximately located UAVs may be WiFi signals, and the flight controller may control at least the one or more motor or engines to provide propulsive force to navigate the UAV in formation with a plurality of other UAVs, including the one or more proximately located other UAVs.

Example 27 may be an apparatus of unmanned aerial operation, comprising: means for receiving communication signals, including means for receiving absolute positioning system (APS) signals from one or more APS sensors, and relative positioning signals from one or more proximately located other UAVs; and means for controlling at least one or more motors or engines of the UAV to provide propulsive force to navigate the UAV to navigate the UAV, based at least in part on the APS, and relative positioning signals.

Example 28 may be example 1927, wherein means for controlling may comprise means for receiving nominal position estimates and the relative positioning signals, and means for generating refined position estimates based at least in part on the nominal position estimates, and the relative positioning signals.

Example 29 may be example 1928, wherein means for generating may comprise means for determining one or more distances to the one or more proximately located other UAVs, based at least in part on received signal strength indicator (RSSI) or time of flight (TOF) of the relative positioning signals from the one or more proximately located other UAVs.

Example 30 may be example 29, wherein means for generating the refined position estimates may comprise means for generating the refined position estimates based to position estimates that minimize a loss function (L):

$$L = \Sigma_{i=1,N}|P_{est,i} - P_{aps,i}|^2 + \Sigma_{i=1,N}\Sigma_{j=1,N}\eta(\text{DistToRSSI}(+P_{est,i} - P_{est,j}+) - \text{RSSI}_{i,j})^2$$

where

N is the number of UAV;
$P_{est,\,i}$ is nominal estimated position of UAV i;
$P_{aps,\,i}$ is APS and barometer position of UAV i;
DistToRSSI( ) is a function the transform distance into RSSI;
$\text{RSSI}_{i,j}$ is measured RSSI between $UAV_i$ and $UAV_j$;
$\eta$ is the weight in loss function.

Example 31 may be example 28, further comprising means for sensing barometric pressure, wherein means for controlling may comprise means for receiving barometric pressure data, the APS signals, and position control information, and means for generating the nominal position estimates based at least in part on the barometric pressure data, the position control information, and the APS signals.

Example 32 may be example 31, may further comprise means for sensing current altitudes of the UAV, wherein means for controlling comprising means for receiving feedback from one or more motors or engines, and current altitudes, and means for providing control signals to the one or more motors or engines and the position control information to the means for generating the nominal position estimates, based at least in part on the feedback and the current altitudes.

Example 33 may be example 32, wherein means for controlling may further comprise means for receiving the refined position estimates, and means for providing control signals to the one or more motors or engines and the control information to the means for generating the nominal position estimates, based on the refined position estimates.

Example 34 may be any one of examples 27-33, wherein the ABS signals may be Global Positioning System (GPS) signals from one or more GPS satellites, the relative positioning signals from the one or more proximately located UAVs may be WiFi signals, and means for controlling may comprise means for controlling at least the one or more motor or engines to provide propulsive force to navigate the UAV in formation with a plurality of other UAVs, including the one or more proximately located other UAVs.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An unmanned aerial vehicle (UAV), comprising:
a transmitter-receiver arrangement to transmit and receive communication signals, including receipt of absolute positioning system (APS) signals from one or more APS sensors, and relative positioning signals from one or more proximately located other UAVs; and one or more motors or engines to provide propulsive force for the UAV; and a flight controller coupled to the transmitter-receiver arrangement and the one or more motors or engines to control at least the one or more motors or engines to provide propulsive force to navigate the UAV, based at least in part on the APS, and the relatively positioning signals;
wherein the flight controller is to include a position fusion function to receive nominal position estimates from a position estimation function, and the relative positioning signals from the transmitter-receiver arrangement, and generate refined position estimates based at least in part on the nominal position estimates, and the relative positioning signals.

2. The UAV of claim 1, wherein the position fusion function is to determine one or more distances to the one or more proximately located other UAVs, based at least in part on received signal strength indicator (RSSI) or time of flight (TOF) of the relative positioning signals from the one or more proximately located other UAVs.

3. The UAV of claim 1, wherein the position fusion function is to generate the refined position estimates based on position estimates that minimize a loss function (L):

$$L = \Sigma_{i=1,N}|P_{est,i} - P_{aps,i}|^2 + \Sigma_{i=1,N}\Sigma_{j=1,N}\eta(\text{DistToRSSI}(|P_{est,i} - P_{est,j}|) - \text{RSSI}_{i,j})^2$$

where

N is a number of UAV;
$P_{est,\,i}$ is nominal estimated position of UAV i;
$P_{aps,\,i}$ is APS and barometer position of UAV i;
DistToRSSI( ) is a function the transform distance into RSSI;
$\text{RSSI}_{i,j}$ is measured RSSI between $UAV_i$ and $UAV_j$;
$\eta$ is the weight in loss function.

4. The UAV of claim 1, further comprising a barometer to sense barometric pressure, wherein the flight controller is to include a position estimation function to receive barometric pressure data from the barometer, the APS signals from the transmitter-receiver arrangement, and position control information, and generate the nominal position estimates based at least in part on the barometric pressure data, the position control information, and the APS signals.

5. The UAV of claim 4, further comprises an altimeter to sense current altitudes of the UAV, wherein the flight controller is to include a position control function to receive feedback from the one or more motors or engines, and the current altitudes from the altimeter, and provide control signals to the one or more motors or engines and the control information to the position estimation function, based at least in part on the feedback and the current altitudes.

6. The UAV of claim 5, wherein the position control function is to further receive the refined position estimates, and provide control signals to the one or more motors or engines and the control information to the position estimation function, based on the refined position estimates.

7. The UAV of claim 1, wherein the UAV is a dual copter, a tricopter or a quadcopter having two, three or four motors, and wherein the flight controller is to control an amount of propulsion provided by each of the two, three or four motors that includes controlling the two, three or four motors to provide different amounts of propulsion to provide a desired roll, pitch or yaw for the UAV.

8. An unmanned aerial vehicle (UAV), comprising:
a transmitter-receiver arrangement to transmit and receive communication signals, including receipt of absolute positioning system (APS) signals from one or more APS sensors, and relative positioning signals from one or more proximately located other UAVs; and
one or more motors or engines to provide propulsive force for the UAV; and
a flight controller coupled to the transmitter-receiver arrangement and the one or more motors or engines to control at least the one or more motors or engines to provide propulsive force to navigate the UAV, based at least in part on the APS, and the relatively positioning signals;
wherein the one or more motors or engines comprises a jet engine, and the UAV further comprises one or more stabilizers, one or more flaps, one or more elevators and a rudder; and wherein the flight controller is to control an amount of jet propulsion provided by the jet engine, and to control one or more of the one or more stabilizers, the one or more flaps, the one or more elevators and the rudder to provide a desired roll, pitch or yaw for the UAV.

9. The UAV of claim 8, wherein the APS signals from the one or more APS sensors are Global Positioning System (GPS) signals, the relative positioning signals from the one or more proximately located UAVs are WiFi signals, and the flight controller is to control at least the one or more motors or engines to provide propulsive force to navigate the UAV in formation with a plurality of other UAVs, including the one or more proximately located other UAVs.

10. A method for operating an unmanned aerial vehicle (UAV), comprising:
receiving, by the UAV, communication signals, including receiving absolute positioning system (APS) signals from one or more APS sensors, and relative positioning signals from one or more proximately located other UAVs; and
controlling, by the UAV, at least one or more motors or engines of the UAV to provide propulsive force to navigate the UAV, based at least in part on the APS and relative positioning signals;
wherein controlling comprises receiving nominal position estimates and the relative positioning signals, and generating refined position estimates based at least in part on the nominal position estimates, and the relative positioning signals.

11. The method of claim 10, wherein generating comprises determining one or more distances to the one or more proximately located other UAVs, based at least in part on received signal strength indicator (RSSI) or time of flight (TOF) of the relative positioning signals from the one or more proximately located other UAVs.

12. The method of claim 10, further comprising sensing barometric pressure, wherein controlling comprises receiving by a position estimation function, barometric pressure data, the APS signals, and position control information, and generating, by the position estimation function, the nominal position estimates based at least in part on the barometric pressure data, the position control information, and the APS signals.

13. The method of claim 12, further comprises sensing current altitudes of the UAV, wherein controlling comprising receiving, by a position control function, feedback from one or more motors or engines, and current altitudes, and provide control signals to the one or more motors or engines and the position control information to the position estimation function, based at least in part on the feedback and the current altitudes.

14. The method of claim 13, wherein controlling further comprises receiving, by the position control function, the refined position estimates, and providing control signals to the one or more motors or engines and the control information to the position estimation function, based on the refined position estimates.

15. The method of claim 10, wherein the APS signals are Global Positioning System (GPS) signals from one or more GPS satellites, the relative positioning signals from the one or more proximately located UAVs are WiFi signals, and controlling comprises controlling at least the one or more motors or engines to provide propulsive force to navigate the UAV in formation with a plurality of other UAVs, including the one or more proximately located other UAVs.

16. One or more computer-readable media comprising instructions that cause an unmanned aerial vehicle (UAV), in response to execution of the instructions by one or more processors of the UAV, to provide a flight controller to receive communication signals, including receipt of absolute positioning system (APS) signals from one or more APS sensors, and relative positioning signals from one or more proximately located other UAVs; and to control at least one or more motors or engines to provide propulsive force to navigate the UAV, based at least in part on the APS and relative positioning signals;
wherein the flight controller is to include a position fusion function to receive nominal position estimates from the position estimation function, and the relative positioning signals from the transmitter-receiver arrangement, and generate refined position estimates based at least in part on the nominal position estimates, and the relative positioning signals..

17. The one or more computer-readable media of claim 16, wherein the position fusion function is to determine one or more distances to the one or more proximately located other UAVs, based at least in part on received signal strength indicator (RSSI) or time of flight (TOF) of the relative positioning signals from the one or more proximately located other UAVs.

18. The one or more computer-readable media of claim 16, wherein the flight controller is to include a position estimation function to receive barometric pressure data from the APS signals, and position control information, and generate the nominal position estimates based at least in part on the barometric pressure data, the position control information, and the APS signals.

19. The one or more computer-readable media of claim 18, wherein the flight controller is to include a position control function to receive feedback from the one or more motors or engines, and the current altitudes, and provide control signals to the one or more motors or engines and the control information to the position estimation function, based at least in part on the feedback and the current altitudes.

20. The one or more computer-readable media of claim 19, wherein the position control function is to further receive the refined position estimates, and provide control signals to the one or more motors or engines and the control information, based on the refined position estimates.

21. The one or more computer-readable media of claim 16, wherein the APS signals are Global Positioning System (GPS) signals from one or more GPS satellites, the relative positioning signals from the one or more proximately located UAVs are WiFi signals, and the flight controller is to control at least the one or more motors or engines to provide propulsive force to navigate the UAV in formation with a plurality of other UAVs, including the one or more proximately located other UAVs.

* * * * *